United States Patent Office 3,361,826
Patented Jan. 2, 1968

3,361,826
Δ⁶-DEHYDRO-DES-(ACETYLAMINO)-COLCHICINE
Albert Eschenmoser, Zollikon, Zurich, and Jakob Schreiber, Zurich, Switzerland, assignors to Ciba Corporation, New York, N.Y., a corporation of Delaware
No Drawing. Filed June 4, 1962, Ser. No. 199,666
Claims priority, application Switzerland, June 8, 1961, 6,673/61
The portion of the term of the patent subsequent to Dec. 7, 1982, has been disclaimed
2 Claims. (Cl. 260—590)

The present invention relates to new ethers. More especially it concerns alkyl ethers of Δ⁶-dehydro-des-(acetylamino)-colchiceine. The new compounds correspond to the formula

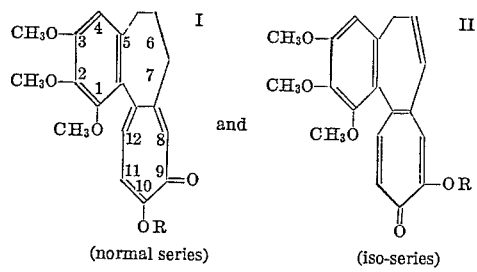

(normal series)        (iso-series)

where R represents an alkyl such as a lower alkyl radical, for example a methyl, ethyl, propyl, butyl, pentyl or hexyl radical.

The new compounds have a cystostatic and antimitotic effect. They inhibit the cell division by preventing the formation of the spindle (metaphase) during the process of nucleus division. The new compounds can also be used in the cultivation of plants to produce polyploid plants.

The compounds of the normal series are particularly effective, in fact considerably more so than colchicine or desacetylmethyl-colchicine.

The new compounds are obtained when Δ⁶-dehydrodes-(acetylamino)-colchiceine is reacted with a diazoalkane in known manner and, if desired, the resulting mixture of the isomeric alkyl ethers is separated in known manner. The reaction is carried out in known manner in the presence of a solvent and/or diluent, preferably at room temperature or below it.

The isolation of the two isomeric alkyl ethers from the mixture obtained by the present process is carried out in known manner, for example by fractional crystallization and/or adsorption, elution and crystallization. The adsorption is advantageously performed by chromatography, above all on alumina. A suitable eluant is, for example, ethyl acetate or ethyl acetate+benzene. From the fractions thus obtained the ethers are separated in pure form by crystallization. The content of isomeric ethers of each fraction is easy to determine by thin-layer chromatography.

The starting materials are known or can be made by known methods.

The new compounds are suitable for use as medicaments, for example in the form of pharmaceutical preparations, or as media for the cultivation of polyploid plants, said preparations and media containing the new compounds in admixture or conjunction with an organic or inorganic, solid or liquid vehicle. As vehicles suitable for pharmaceutical purposes there may be mentioned above all those which do not react with the new compounds and are suitable for enteral, parenteral or local administration such, for example, as water, alkanols, gelatine, lactose, starches, stearyl alcohol, magnesium stearate, talcum, vegetable oils, benzyl alcohols, gums, propylene glycol, polyalkylene glycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilized and/or may contain assistants, such as preserving, stabilizing, wetting or emulsifying agents, solution promoters or salts for regulating the osmotic pressure, or buffers. They may also contain other therapeutically useful substances. For use in veterinary medicine the new preparations may be admixed with animal fodder.

The pharmaceutical preparations contain with advantage approximately 0.001 to 0.5 mg. more especially 0.01 to 0.1 mg. of active principle per dosage unit.

The amount of vehicle to be used may vary within wide limits and depends above all on the form in which the medicament is administered.

The daily dose depends on the form of administration and on the individual requirements.

For use in the production of polyploid plants the preparations may be, for example, in solid form or in the form of a solution, suspension or emulsion. Suitable vehicles are, for example, water, agar, glycerol or lanolin. The preparations may also contain further assistants, such as preserving, stabilizing wetting or emulsifying agents, as well as other substances suitable for plant cultivation. Preparations in liquid form may be used, for example, for spraying plants, while in the form of ointments they can be applied to the plant as they are. Alternatively, the plant may be brushed, for example, with a solution containing the active principle, or it may be dipped into such a solution. The dose and the time for which the preparation is allowed to act depend on the way of its administration and on the type of plant to be treated. Since the toxicity towards plants is in general inferior to that towards animals, correspondingly higher doses may be given.

The following examples illustrate the invention without thereby restricting its scope.

EXAMPLE 1

A solution of 5.0 grams of Δ⁶-dehydro-des-(acetylamino)-colchiceine in a mixture of 100 cc. of methylene chloride and 100 cc. of methanol is treated, while being cooled in an ice bath, at 0° C. dropwise with 250 cc. of approximately 0.6 N-ethereal diazomethane solution; the mixture is kept for ½ hour at 0° C., and then evaporated in a water-jet vacuum. The residue is taken up in methylene chloride and washed twice with 2 N-sodium hydroxide solution and three times with sodium chloride solution. The methylene chloride solution is dried and then evaporated in a water-jet vacuum. The resulting residue consists of a mixture of Δ⁶-dehydro-des-(acetylamino)-colchicine (I) and Δ⁶-dehydro-des-(acetylamino)-isocolchicine (II) of the formulae

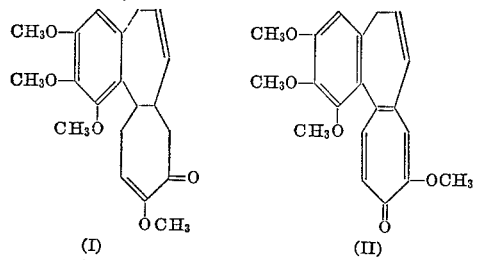

(I)              (II)

The two isomers can be separated in the following manner.

The mixture of the isomers is recrystallized from a 1:1-mixture of acetone and ether, to yield the following three fractions:

Fraction 1—M.P. 183–187° C.:II, pure
Fraction 2—M.P. 150–158° C.:I+II
Fraction 3—M.P. 151–154° C.:I+little II For purification the Fractions 2 and 3 and the mother liquor are poured over a column of alumina (approximately 20 times the amout of alumina; column 4 x 25 cm.; activity II) and development is carried out with a 2:1-mixture of ethyl acetate and benzene. In each case fractions of approximately 50 cc. are collected. The first 7 fractions contain a mixture of the two isomers (I and II), each mixture turning crystalline on addition of methylene chloride and ether. The subsequent fractions contain pure $\Delta^6$-dehydro-des-(acetylamino)-colchicine (I) melting at 173–174° C. (from methylene chloride+ether). The amount of the isomeric ethers contained in each fraction can be checked by thin-layer chromatography on alumina. The chromatogram is developed with ethyl acetate. The spots of substance are visible under an ultra-violet fluorescence lamp. The iso-compound (II) migrates faster than $\Delta^6$-dehydro-des-(acetylamino)-colchicine (I).

EXAMPLE 2

Tablets, containing $\Delta^6$-dehydro-des-(acetylamino)-colchicine as active principle, can be made in the conventional manner from:

|  | Mg. |
|---|---|
| $\Delta^6$-dehydro-des-(acetylamino)-colchicine | 0.1 |
| Lactose | 70.9 |
| Gelatine | 1.5 |
| Wheat starch | 35 |
| Arrowroot | 12 |
| Magnesium stearate | 0.2 |
| Talcum | 5.3 |
|  | 125.0 |

What is claimed is:
1. A compound of the formula

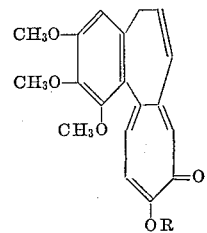

in which R represents lower alkyl.
2. $\Delta^6$-dehydro-des-(acetylamino)-colchicine.

References Cited

UNITED STATES PATENTS 3,222,253  12/1965  Eschenmoser et al.

OTHER REFERENCES

Pesaro, Synthese des Colchicins (Von der Eidgenossischen Technischen Hochschule in Zurich), Prom., No. 3086, page 22 (1960).

Van Tamelen et al., J. Am. Chem. Soc. 81, 6341–6342 (1959).

Schreiber et al., Helv. Chim. Acta, 44, 559 (1961).

DANIEL D. HORWITZ, *Primary Examiner.*

L. WEINBERGER, *Examiner.*